April 14, 1964  J. BARTONE  3,129,019
TRAILER HITCH
Filed June 1, 1961

INVENTOR
JOHN BARTONE
BY
Charles L. Lovercheck
attorney

United States Patent Office 3,129,019
Patented Apr. 14, 1964

3,129,019
TRAILER HITCH
John Bartone, 1052 E. 24th St., Erie, Pa.
Filed June 1, 1961, Ser. No. 114,247
7 Claims. (Cl. 280—485)

This invention relates to trailer hitches and, more particularly, to the type of trailer hitch suitable for towing house trailers.

Trailer hitches for this purpose are generally of two types; frame hitches and axle hitches. Frame hitches support the trailer from the frame of an automobile and any vibration of the trailer is transmitted from the trailer directly to the automobile body to the discomfort of the occupants. Axle hitches support the trailer from the axle of the automobile.

Various contrivances have been provided to support the trailer on a cantilever arrangement resiliently fixed to the trailer and connected to the axle under the body of the car. Various devices have been made to accomplish the foregoing purpose, many of which have been complicated, expensive, and unsatisfactory.

It is, accordingly, an object of the present invention to overcome the defects of prior trailer hitches by providing an axle hitch wherein a trailer is connected to the hitch by a simple pivotal connection only with no other connection between the hitch and the trailer.

Another object of the invention is to provide an improved axle type hitch for a trailer.

A further object of the invention is to provide an axle type hitch for a trailer which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
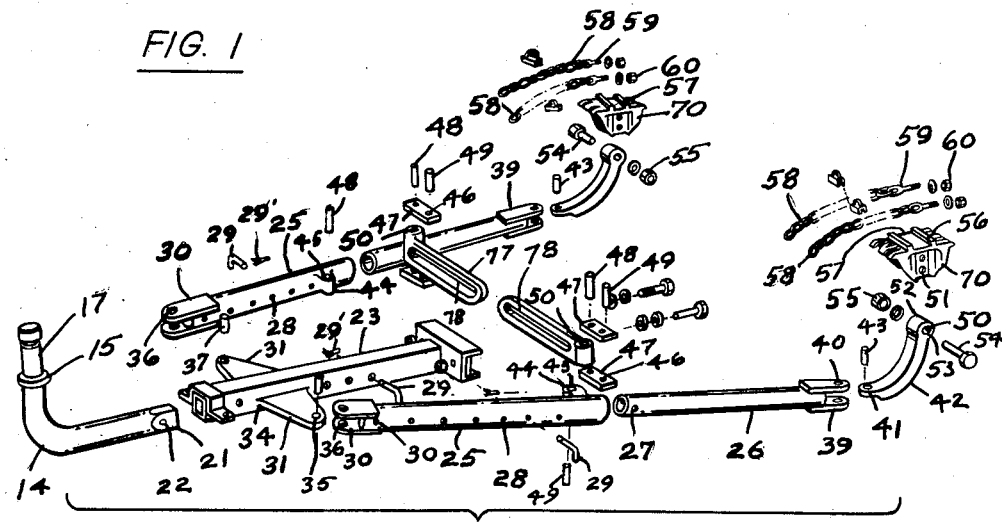
FIG. 1 is an exploded view of a trailer hitch shown in FIG. 2.
Figure 2:
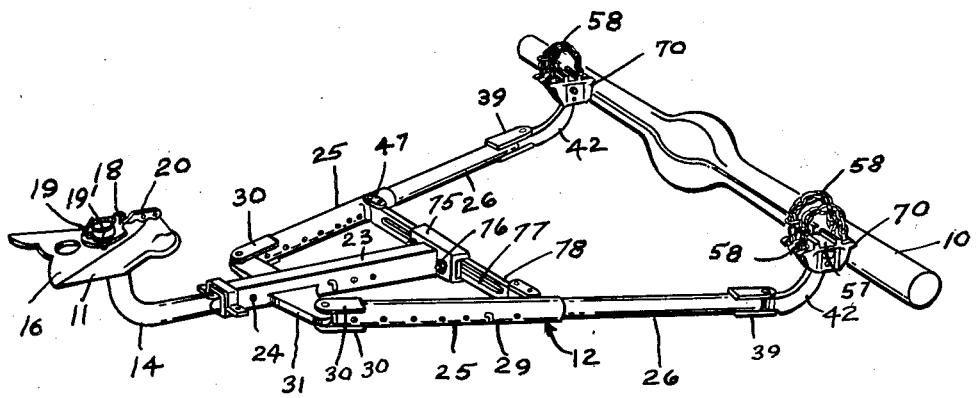
FIG. 2 is a view of the hitch for a trailer according to the invention supported on an automobile axle.

With more particular reference to the drawing, an automobile axle 10 is shown with a trailer tongue 11 attached thereto by a hitch 12. The hitch 12 is made up generally of an A-frame attached to a heavy, resilient, stiff spring 14 round in cross section.

The spring 14 is preferably made of molybdenum steel which gives it great strength and extreme flexibility under load stress. The spring 14 is shown by way of example in the form of a round rod bent in a generally L-shape and having a flange 15 formed on the upstanding end. The lower part of a plate 16 rests on the flange 15 and an upper end 17 defines a pintle which extends through a hole 19' in the flange 15 of the tongue 11. The pintle 17 has a peripheral groove therein which receives the peripheral edge of a locking plate 18 which is swingably connected to the plate 16 at 19 and locked in place by means of a key 20. The rear end of the spring 14 terminates in a square portion 21 which is received in the square open end of a square central tube 23. A pin 24 extends through the square tube 23 and through a hole 22 to lock the spring 14 in position.

The A-frame is made up of two side leg members each having a heavy seamless tube 25 which telescopically receives legs 26. These legs each have a hole 27 in the front end thereof which may be aligned with either of the holes 28 so that pins 29' may be extended therethrough to hold the legs 26 in adjusted position in the tube 25. Bolts 29 receive the cotter pins 29'. The front ends of the tube 25 have plates 30 welded to the top and bottom thereof and the plates 30 receive brackets 31 which are welded to the square tube 23 at 34 and extend outwardly therefrom. The brackets 31 have holes 35 in the outer ends thereof and these holes are aligned with holes 36 in the plates 30 when the brackets 31 are received between the plates 30. Pins 37 extend through the holes 36 and the holes 35 to hold the tube 25 to the tube 23.

The rear ends of the rear legs 26 have spaced plates 39 thereon welded thereto. The plates 39 have holes 40 therein which are adapted to be aligned with holes 41 in angular members 42 and pins 43 lock the plates 39 to the members 42.

Lugs 44 are welded to the tube 25 near the rear end and extend inwardly therefrom. These lugs have holes 45 therein which are aligned with holes 46 in spaced plates 47 and these spaced plates receive pins 48 and 49, one of which extends through each of the holes 46. One of the holes is aligned with a hole 50 in a bracket 78.

Saddles 70 have spaced downwardly extending flanges 51 which receive an upper eyed rear end 52 of the member 42. A hole 53 is formed in the member 42 which receives bolts 54. A nut 55 with its lock washer holds the bolt in place. The saddles 70 have spaced upwardly extending flanges 56 which define grooves 57 therein which receive the lower side of the axle 10. Chains 58 overlie the upper side of the axle and one end is received in slots while the rear end has an eye bolt 59 thereon and receives nut 60 threadably thereon. The nuts 60 rest under the rearwardly extending legs at the sides of the slots which receive the eye bolt 59.

The rear end of the square tube 23 is welded to a transverse channel 75 which has holes receiving bolts 76. The bolts 76 are received in slots 77 in the brackets 78. The bolts 76 lock the brackets 78 to adjust the spacing between the legs 26.

It will thus be seen that when the saddles 70 are placed under the axles and held in place by the chains 58 and the nuts 60 tightened on the eye bolts 59, the saddles will be clamped rigidly to the axles and when the spring 14 is received in the hole 19' in the flange 15 which is attached to the trailer tongue, the trailer can only swing downwardly by deflecting the spring 14 by bending. Therefore, the trailer can pivot on the upwardly extending member of the spring but it cannot swing downwardly and will be carried with its weight supported on the axle 10.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A trailer hitch comprising an A-shaped frame having forwardly extending legs, and means on said legs for attaching them to the axle of a vehicle, said frame terminating at its rear end in an upwardly turned cylindrical resilient member, a trailer tongue having a vertically extending hole therein defined by a cylindrical surface, said upwardly turned member being rotatably received and snugly fitting in said hole and complementary in shape to said hole whereby said tongue can rotate on said upwardly turned member and deflect said upwardly turned member when said trailer tongue swings downwardly, said trailer hitch being supported on said axle only.

2. The hitch recited in claim 1 wherein said legs of said A-shaped frame are made of telescoping members with means to lock said members relative to each other.

3. The hitch recited in claim 1 wherein said means to attach said legs to said axle comprises saddle members adapted to rest against a vehicle axle, and means overlying said axle for clamping said saddle members thereto.

4. The hitch recited in claim 1 wherein means is provided to lock said legs in spaced relation to each other.

5. A trailer hitch comprising a relatively heavy, resilient, stiff, generally L-shaped member, said member having a vertically extending cylindrical upper end, means adapted to be attached to a trailer tongue, said means having a vertically extending cylindrical hole therein complementary in shape to said cylindrical end and snugly receiving said cylindrical end therein, attaching means on the front end of said L-shaped member, spaced rearwardly extending legs, said legs being swingably attached at their rear ends to said attaching means, means attaching an intermediate part of said legs to said attaching means adjustably holding said legs in spaced relation, and means for swingably attaching the front ends of said legs to the axle of an automobile.

6. The hitch recited in claim 5 wherein said means for adjustably holding said legs in spaced relation comprises bracket members swingably attached to said legs at an intermediate position between the ends thereof and adjustably fixed to said attaching means at the outer ends.

7. The hitch recited in claim 6 wherein said means for attaching said legs to said axle comprises curved members swingably attached to said axle at their front ends, then curving downwardly and rearwardly and swingably attached to the front ends of said legs to swing about a vertical axis only thereon.

References Cited in the file of this patent

UNITED STATES PATENTS

| | | |
|---|---|---|
| 1,157,674 | Buuck | Oct. 26, 1915 |
| 1,492,491 | Swope | Apr. 29, 1924 |
| 1,559,541 | Ballentine | Nov. 3, 1925 |
| 2,773,704 | Saxon | Dec. 11, 1956 |
| 2,788,228 | Williamson et al. | Apr. 9, 1957 |